United States Patent
Koivusaari

(10) Patent No.: US 7,131,269 B2
(45) Date of Patent: Nov. 7, 2006

(54) PROCESS AND AN APPARATUS FOR UTILIZING WAVE ENERGY

(75) Inventor: Rauno Koivusaari, Kirkkonummi (FI)

(73) Assignee: AW-Energy Oy, Helsinki (FI)

( * ) Notice: Subject to any disclaimer, the term of this patent is extended or adjusted under 35 U.S.C. 154(b) by 1 day.

(21) Appl. No.: 10/493,445

(22) PCT Filed: Oct. 25, 2002

(86) PCT No.: PCT/FI02/00834

§ 371 (c)(1),
(2), (4) Date: Oct. 5, 2004

(87) PCT Pub. No.: WO03/036081

PCT Pub. Date: May 1, 2003

(65) Prior Publication Data

US 2005/0066654 A1    Mar. 31, 2005

(30) Foreign Application Priority Data

Oct. 26, 2001    (FI)    ................................. 20012086

(51) Int. Cl.
*F03B 13/10* (2006.01)
*F03B 13/12* (2006.01)
*F03B 13/18* (2006.01)
*F16D 31/02* (2006.01)
*H02P 9/04* (2006.01)

(52) U.S. Cl. .......................... 60/495; 60/398; 60/506; 290/53; 417/330

(58) Field of Classification Search .................. 60/398, 60/495–507, 641.1, 641.6, 641.7; 290/42, 290/53; 417/330

See application file for complete search history.

(56) References Cited

U.S. PATENT DOCUMENTS

| 675,039 | A | | 5/1901 | Graff | 60/499 |
|---|---|---|---|---|---|
| 4,001,597 | A | | 1/1977 | Graff | 290/53 |
| 4,002,416 | A | * | 1/1977 | Axford | 60/398 |
| 4,371,788 | A | * | 2/1983 | Smith, Jr. | 290/53 |
| 4,384,456 | A | | 5/1983 | Boros | 60/499 |
| 4,748,808 | A | * | 6/1988 | Hill | 60/398 |
| 6,006,518 | A | * | 12/1999 | Geary | 290/53 |
| 6,392,314 | B1 | * | 5/2002 | Dick | 290/53 |
| 6,756,695 | B1 | * | 6/2004 | Hibbs et al. | 290/53 |
| 6,955,049 | B1 | * | 10/2005 | Krouse | 60/398 |
| 7,023,104 | B1 | | 4/2006 | Kobashikawa et al. | 290/53 |
| 2004/0007881 | A1 | * | 1/2004 | Kobashikawa et al. | 290/53 |

FOREIGN PATENT DOCUMENTS

| JP | 56-110573 | 9/1981 |
|---|---|---|
| JP | 59-043987 | 3/1984 |
| JP | 59-203882 | 11/1984 |
| JP | 61-261676 | 11/1986 |
| JP | 4-358769 | 12/1992 |
| WO | 97/37123 | 10/1997 |
| WO | 98/17911 | 4/1998 |
| WO | 99/28623 | 6/1999 |

* cited by examiner

*Primary Examiner*—Sheldon J Richter
(74) *Attorney, Agent, or Firm*—Young & Thompson

(57) ABSTRACT

The invention relates to a method for utilising wave energy. In the method, the reciprocating movement of a water mass (5) in the vicinity of the bottom (6) of a water basin is adapted to actuate a body (2) or its part attached to the bottom of the water basin, the kinetic energy of the body (2) or its part being recovered into an energy reserve (3), and the energy being transferred from the energy reserve to the object of application. The invention also relates to the apparatus (1) used in the method.

14 Claims, 2 Drawing Sheets

PROCESS AND AN APPARATUS FOR UTILIZING WAVE ENERGY

The invention relates to an arrangement as defined in the preamble of claim 1 for utilising wave energy.

The invention also relates to an apparatus as defined in the preamble of claim 6 for utilising wave energy.

When the wind is blowing, waves are formed in the same direction over a long period of time. In deep water, waves generated under the effect of the wind have a given predominating, i.e. average wavelength L and a height, i.e. amplitude, which both depend on the wind force and on the period over which the wind is blowing. As a wave is proceeding towards shallower water, its wavelength shortens and the wave height increases under the action of the water bottom on the wave. As the wave (amplitude) has reached a sufficient height in a water depth depending on a specific wavelength, the wave will break. This depth at which a wave breaks is called "breaker line" in literature. It should be noted that the wave breaking line is not constant, but depends to some extent on the wavelength and amplitude, which, in turn, depend on wind conditions. The breaker line is usually ¼ to ⅕ of the prevailing wavelength L. The wave breaking line remains mainly the same at a specific location on the sea coast, because the prevailing wind conditions mostly remain roughly the same.

FIG. 3 illustrates the effect of a wave on the water mass in a water basin, such as the sea near the coast. The wave action depth Z depends on its wavelength such that a wave having a wavelength L still acts at a depth L/2. In the area A in FIG. 3, i.e. in deep water, the orbit of each point of the water mass is circular. The wavelength L of the waves is great compared to the water depth H, i.e. the ratio is in the range ½-∞. As the wave proceeds towards shallower water, its amplitude increases, and the wavelength decreases, the ratio of the wavelength to the water depth decreasing. In intermediate water, in area B of FIG. 3, the prevailing wavelength L is about ½ to ½₀ of the water depth H. The water mass has a circular movement in surface water, however, while proceeding towards the bottom of the water basin, the trajectory of each point in the water mass becomes first elliptic, and proceeding further in depth, the elliptic shape of the point trajectory increases, and eventually, near the bottom of the water basin, each point in the water mass has a trajectory following roughly a reciprocating movement around a given centre. In shallow water, i.e. in coast area C in FIG. 3, the ratio of the water depth H to the prevailing wavelength L is 0 to ½₀, whereas said breaker line is at a water depth of ¼ to ⅕. In shallow water, the wave action goes all the way to the bottom, while the water mass has an elliptic movement.

Various systems for recovery of the kinetic energy of waves have been developed. Usually they are based on bodies floating on the water surface and moved by the waves. The kinetic energy of bodies floating on the surface is recovered in one way or the other, into generators or compression cylinders located either on or under the water surface, from where energy can be transferred to the objects of application.

The main problem caused by known systems for recovery of wave energy of the type described above relates to their location; in rough sea, structures on the surface are constantly exposed to damage. Due to this risk of damage, power plants utilising wave energy built so far have relatively low power.

There are also known systems for recovery of the kinetic energy from the waves, which are anchored to the bottom of a water basin, such as a lake or the sea. One such system is represented by the apparatus disclosed by PCT patent application Ser. No. 98/17911, which is attached to the bottom of the water basin and in which wave energy is recovered from a plate, which is attached to the water bottom and oscillated by the waves. The plate reaches partly the water surface. The apparatus is mounted in the area between the wave breaking line and shallow water, at the bottom of the water basin. This apparatus involves the problem of its position at the wave breaker line, where the wave movement and hence the energy available is irregular and inappropriate for continuous energy production. The plate is partly above the surface level, so that the apparatus is exposed to damage in rough sea. U.S. Pat. No. 4,001,597 also describes a system for recovery of wave energy, whose pumping unit is anchored to the sea bottom. The pumping unit is located in shallow water and the pressure plate reaches the surface or slightly under the surface. This system also involves the problem of the position of the pressure plate. Even though it might be under the water surface under calm conditions, in rough sea, it will be at least partly on the surface, and the system is consequently exposed to damage. The position of the system also causes a second problem: the movement of the waves in shallow water is too irregular for regular energy production to be achieved.

The invention is intended to eliminate the prior art inconveniences.

Thus, the first chief objective of the invention is to provide a method for recovering kinetic energy bound in waves with high efficiency and as regularly as possible, regardless of wind conditions. This means that the arrangement aims at optimal minimising of wave energy variations caused by weather conditions prevailing above the water surface.

The second chief objective of the invention is to provide an apparatus for use in the arrangement for recovering the kinetic energy of waves, whose exposure to damage caused by weather conditions is minimised.

The invention relates to an arrangement as defined in the preamble of claim 1 for utilising wave energy. In the arrangement of the invention, the reciprocating movement of the water mass in the vicinity of the bottom of the water basin is adapted to actuate a body or part of the body to the bottom of the water basin. Said body is attached at one side to the bottom of the water basin, in the intermediate water region of the water basin (area B in FIG. 3), and it is disposed under the water in its totality. The kinetic energy of the body or part of it is recovered into an energy reserve, from where energy is transferred to the object of application.

The movement of the water mass has preferably been adapted to actuate the plate-like body and the kinetic energy of the water mass is recovered substantially into an energy reserve under the water surface, such as a compression cylinder.

The body is preferably attached to the bottom of the water basin located entirely at a depth where the movement of the water mass is substantially reciprocating of elliptic. More preferably, the body is located at a depth where the movement of the water mass is substantially reciprocating and the energy of the water mass remains substantially constant.

The apparatus of the invention, in turn, comprises a body, which is entirely or partly disposed to move under the reciprocating movement of the water mass, means for storing the kinetic energy of the body or part of it in the energy reserve, and means for transferring energy from the energy reserve to the object of application. The body has been adapted for attachment to the bottom of the water basin, in the intermediate water region, and the body is entirely immersed in water when attached to the bottom of the water basin.

In a preferred embodiment of the invention, the body is plate-like and attached at one side to a base on the bottom of the water basin.

In a second preferred embodiment of the invention, the body or part of it has a weight less than the specific weight of water.

The method of the invention and the apparatus used in it achieve appreciable benefits over previously known systems and apparatuses utilising wave energy.

In this context, the object of application may be an apparatus for transforming energy into another form of energy, such as the aggregate unit of a hydraulic turbine.

In this context, we point out that the definition "body attached to the bottom of a water basin" implies both direct attachment of the body to the bottom, e.g. by means of fixing lugs, and indirect attachment of the body to the bottom, e.g. by a separate base, which, in turn, is anchored to the bottom. The water basin is a lake, a sea or a similar.

The invention is based on the surprising observation that the energy of surface waves near the bottom at the intermediate water depth is almost equal to and in some cases even exceeds that of water surface waves. This energy mainly occurs as kinetic energy. The invention utilises this kinetic energy.

As shown in FIG. 3, a given point in the water mass in shallow water has an elliptic or circular movement, in other words, it has both potential and kinetic energy. Nearly all current wave power plants are devised to operate in the area mentioned above, between the wave breaking line above and shallow water C, because the waves have maximum potential energy in this area owing to their height, and most systems aim at utilising this potential energy in one way or another. However, utilising wave energy in shallow water is notably difficult, especially considering that structures in shallow water are necessarily very close to the surface, where they are readily exposed to rough weather conditions. Moreover, the water mass movement in shallow water is more or less rotating (elliptic), as shown in FIG. 3, and there are always crossing waves to some extent, so that energy production is irregular.

By contrast, the invention is based on the feature of the water mass movement being adapted to actuate a body or its part attached to the bottom of the water basin, in area B, i.e. the intermediate water region in FIG. 3. The body is under the water surface in its totality, preferably at a depth such where the water mass movement is primarily reciprocating or has a regularly elliptic shape. This arrangement achieves a number of major advantages:

in the intermediate water region, the movement of a given point in the water mass is substantially reciprocating, the water mass having then mainly but kinetic energy. Thus the water mass energy remains constant, unlike known wave power plants located in shallow water. The water mass has regular movement relative to a given centre, allowing an apparatus anchored to the water bottom to generate energy more regularly than does an apparatus located partly or entirely above the water surface.

the apparatus of the invention used for energy production in the intermediate depth region is not readily damaged, because it is not exposed to weather conditions prevailing on the water surface, nor to the rotating movement of the water mass, as are energy production systems in shallow water described above. The energy reserve included in the apparatus, such as a compression cylinder, is preferably located completely under water, thus further reducing the risk of damage to the apparatus.

At intermediate depth, the water mass actuated by waves at the bottom of the water basin frequently has almost equal energy, and sometimes even higher energy than the waves in shallow water. This is due to the fact that there are always some cross-waves in shallow water waves caused by obstacles on the water bottom. In this situation, an apparatus located at the bottom of a water basin entirely under the water surface, in shallow water, recovers almost the same amount of energy from the waves as does a wave power plant operating in shallow water partly above the water. For the reasons given above, a wave power plant operating under water can be constructed in larger size and with higher efficiency than a wave power plant operating above water.

The invention is described in greater detail below with reference to the accompanying drawings.

Figure 1:
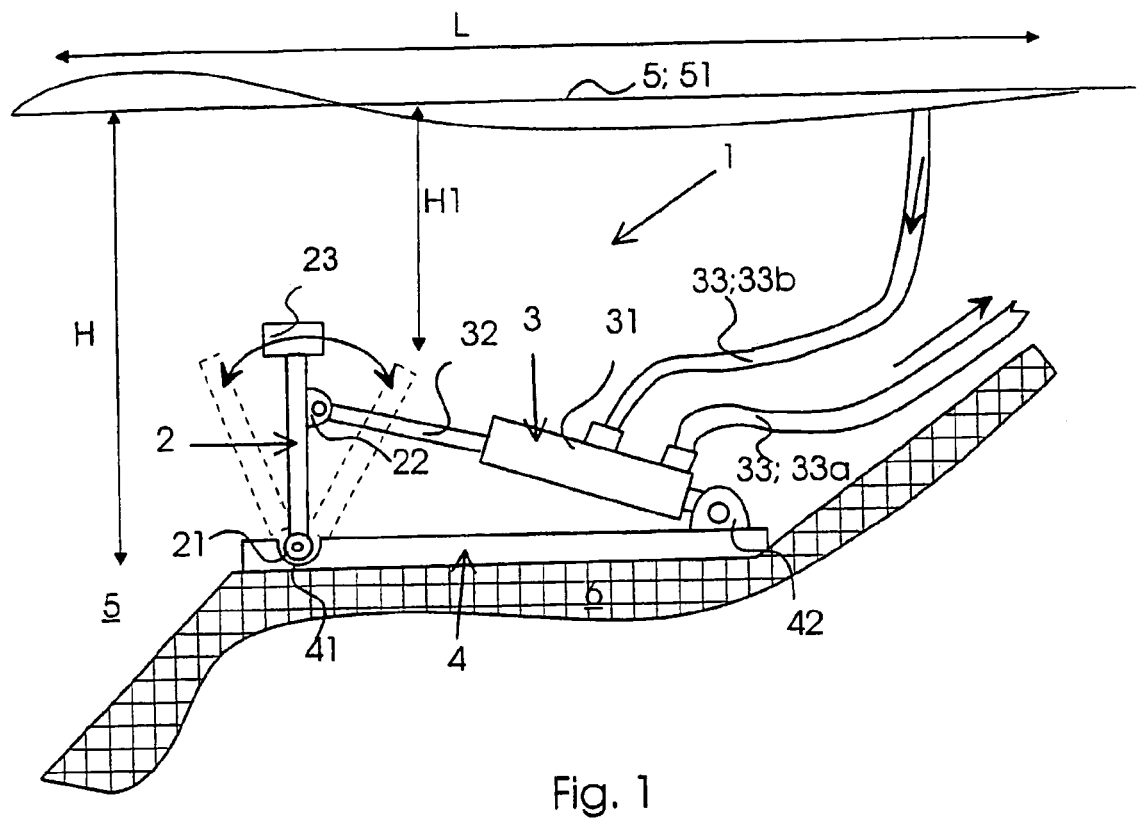
FIG. 1 shows the apparatus of the invention viewed from the side.

The main parts of the apparatus of FIG. 1 are a compression cylinder acting as an energy reserve, a plate pivotally attached to a base at the bottom, and a compression cylinder piston connected to the plate.

The water-lifting arrangement shown in FIG. 2, again, comprises an energy recovery unit and an air-blowing system, which is supplied with compressed air from the compression cylinder in FIG. 1.

The apparatuses illustrated in FIGS. 1 and 2 and the water-lifting arrangement will be described in further detail below. The position of the apparatuses is illustrated in FIG. 3, which is referred to in the general part of the invention above explaining prior art and its differences from the invention.

The apparatus 1 shown in FIG. 1 has a base 4 attached at intermediate water depth at the bottom 6 of the water basin. The bottom 6 of the water basin is at a distance H from the water surface. In the wind conditions prevailing in this coastal area, the waves have a wavelength L, the ratio of the water depth H to the prevailing wavelength is in the range from ½ to ¹/20, i.e. in area B in FIG. 3 (intermediate water depth). The energy-producing parts of the apparatus, i.e. the body 2 and the connected compression cylinder 3, are entirely mounted under the surface, at a depth H1, where the movement of the water mass generated by the waves is still mainly reciprocating. The action depth of the waves is about half of their wavelength L.

A plate-like body 2 is rotatably attached at its lower edge to a groove 4; 41 at the first end of the base 4, by the intermediation of a ball joint 2; 21 at the lower edge of the body. The body has a length of approximately ⅓ of the prevailing wavelength L. At the top part of the body, their is a float 23 having a weight less than the specific weight of water. The pressure tank 31 of the compression cylinder 3 is pivotally fixed to the fixing lug 4; 42 at the other end of the base 4. The piston 32 of the compression cylinder 3 is fixed at one end to the fixing lug 22 of the plate-like body 2. Because the angle between the plate-like body 2 and the piston 3; 32 varies as the body is entrained by the waves, the piston is fixed pivotally to the fixing lug 22, allowing the plate-like body and the piston 3; 32 to move within certain limits relative to one another. Ordinary air is used as the medium of the compression cylinder 3, the air being sucked into the pressure tank through a first air hose 33; 33b leading to the water surface 5; 51. Air is conducted to the object of application through a second air hose 33; 33b from the pressure tank 3; 31.

Figure 2:
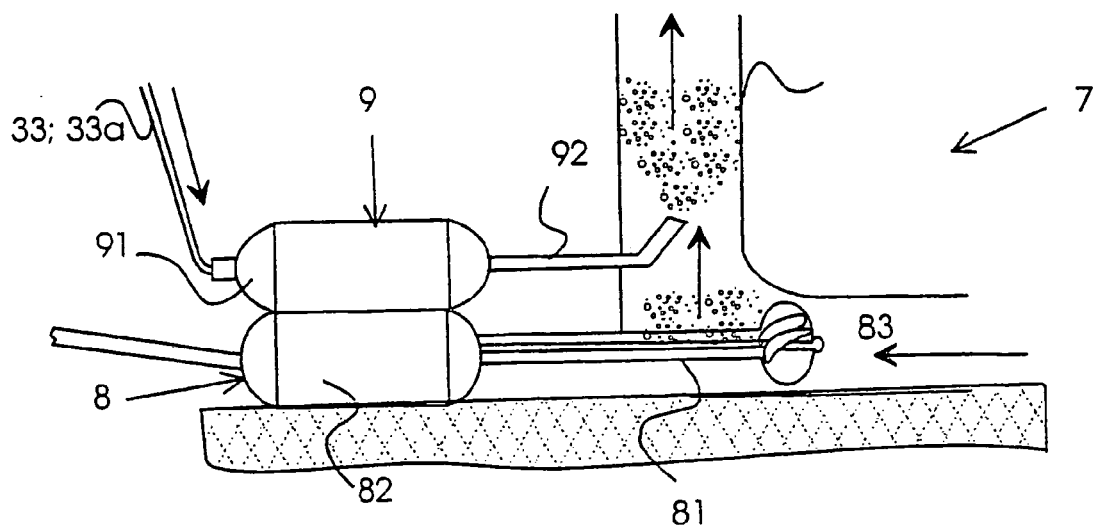
FIG. 2 shows a mode of utilisation of energy supplied with the apparatus of the invention.
Figure 3:
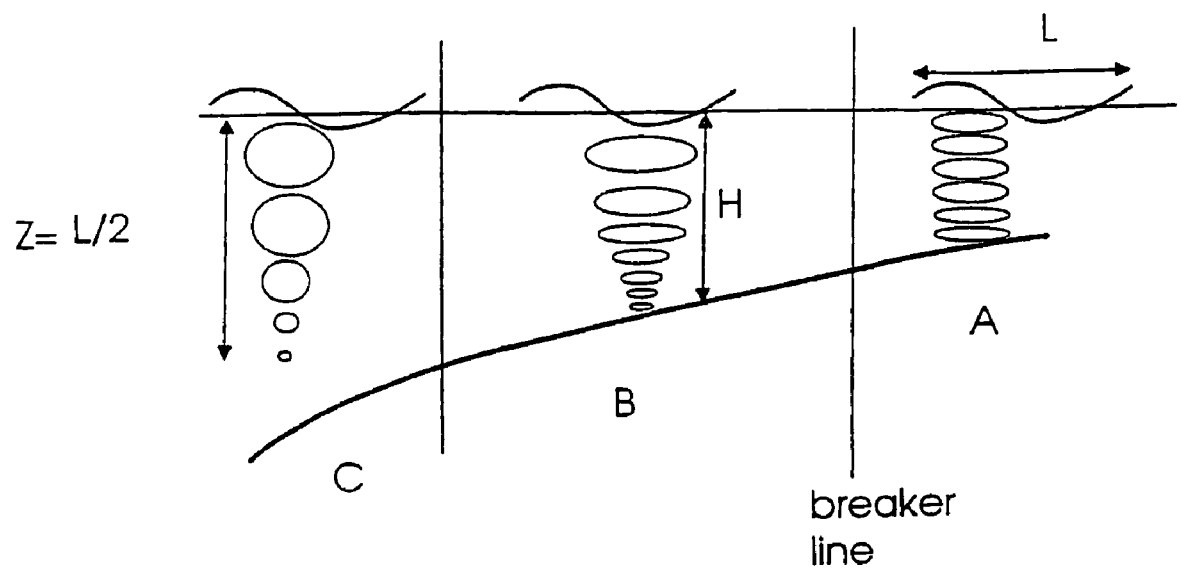
FIG. 3 illustrates the action of waves in a water basin.

FIG. 2 shows a water-lifting arrangement 7, which utilises the compressed air generated with the apparatus 1 in FIG. 1. The unit for energy recovery 8 in the water-lifting arrangement comprises a hydraulic turbine 81, an aggregate 82 connected to the turbine and a duct 83 leading to the water surface. The air-blowing system 9 in the water-lifting arrangement, in turn, comprises an air-collecting tank 91, from which an aeration pipe 92 leads to the duct 83. Compressed air is conducted to the air-collecting tank 91 through a second air hose 33; 33a leading from the pressure tank of FIG. 1. The air-collecting tank 9; 91 contains an air diffuiser (not shown in the figure), which diffuses the compressed air conducted to the aeration pipe into small micro-air bubbles.

In the following, we shall examine the displacement of the plate-like body 2 of the apparatus in FIG. 1 under the movement of the water mass. The water mass movement is primarily reciprocating at the depth H-H1, at which the apparatus is disposed. Then the points in the water mass circulate about a given centre. With the lower edge of the body 2 being fixed to the groove 41 in the base 4, all of the points on the plate 2 will then rotate over a given angle under the reciprocating movement of the water mass along the curved trajectory indicated by the double-ended arrow with a full head. The kinetic centre of the rotational movement is located at the ball joint 2; 21 provided at the lower edge of the plate. The plate 2 is attached roughly at its centre to the piston 3; 32 of the compression cylinder. As the points on the plate rotate under the reciprocating movement of the water mass about the ball joint 2; 21 at a point, from the left to the right and back to the left, the piston 3; 31, in turn, moves in and out of the pressure tank 3; 31, thereby allowing the rotational movement of the plate to be transformed into a pumping movement of the piston in the pressure tank. The pumping movement is enhanced by the floats provided at the top of the body 2, whose weight is lighter than water. The pumping movement of the piston 3; 32 absorbs air through a first air hose 33; 33b into the pressure tank 3; 31 and propels air through a second air hose 3; 33a to the water-lifting arrangement 7 shown in FIG. 2.

As the aeration section 9 of the water-lifting arrangement 7 in FIG. 2 is being supplied with air through the second air hose 33; 33a, air diffuses in the air-collecting tank 9; 91 into small air bubbles, which are ejected from the aeration pipe 9; 92 into the duct 8; 83. The ascending air bubbles generate a Venturi effect in the duct 8; 83, the water in the duct 8; 83 approaching the surface, i.e. passing in the direction indicated by the arrow with a full head, while fresh water enters the duct through its bottom part located at the bottom of the water basin. During its movement, water rotates the hydraulic turbine 8; 81 of the energy-recovery unit. The rotation energy of the hydraulic turbine is transformed into electricity in a conventional aggregate unit (8; 82).

Only one embodiment of the method of the invention and the apparatus implemented in the method has been described above, and it is obvious to those skilled in the art that the invention can be implemented in many other ways as well without departing from the scope of the inventive idea as defined in the claims.

The body may be attached either as described above indirectly to the bottom by the intermediation of a base or any similar fastening, which, in turn, is attached to the bottom by suitable anchoring means, or it may be attached directly to the bottom of the water basin, by means of fastening lugs or the like, for instance.

In case the reciprocating movement of the water mass is transformed into kinetic energy by means of a plate-like body, this is usually relatively thin with a view to efficient utilisation of wave energy, however, in some situations, thicker bodies may also be appropriate, owing to the high kinetic energy of the water mass, for instance.

Instead of a plate-like body, the reciprocating pumping movement of a water mass can be transformed into kinetic energy by say, a device transforming the reciprocating movement into a rotating movement, such as, for instance, a cylindrical body rotationally fixed to the base or a device fixed to the base comprising a propeller or any other part rotating under the action of the water mass movement.

In the embodiment described above, the kinetic energy of the plate-like body is transferred by means of a piston into a compression cylinder acting as an energy reserve, where it compresses the medium (air) in the compression cylinder. The medium thus pressurised, i.e. compressed air in this case, can subsequently be used for the desired application, such as, for instance, a water-lifting arrangement. However, the reciprocating movement of the plate-like body can be transformed into energy in many other ways as well. Means for recovering kinetic energy comprise, for instance, an arm articulated in a plate, the arm having, among other facilities, means for being connected over a lever system to an electric generator, allowing energy to be transformed into electricity, for storage in an accumulator, for instance. In this manner, the mechanical energy of the plate can be transformed into electricity for further distribution in practical application in a conventional manner known per se. The energy reserve is preferably located completely immersed under the water surface, however, if the kinetic energy of the plate is transformed into electric energy by means of an electric generator, the energy reserve may also be located on dry land, for instance.

If the kinetic energy of the reciprocating movement of the water mass is transformed into the kinetic energy of a rotating movement, this can be directly transformed into electricity by means of a generator, for further storage by means known per se.

Besides the compression cylinder and accumulator mentioned above, the energy reserve may be a pressure accumulator, in which energy is stored in the form of the pressure of a hydraulic fluid.

What is claimed is:

1. An apparatus (1) for utilising wave energy, comprising:
    a body (2) shiftable under the reciprocating movement of the water mass such a forward movement of the water mass shifts the body and a reverse movement of the water mass shifts the body,
    means for storing the kinetic energy of the body into an energy reserve (3), and
    means for transferring energy from the energy reserve (3) to the object of application, wherein,
    the body (2) is fastened to the bottom of the water basin, at an intermediate water depth where the movement of each point of the water mass (5) is substantially reciprocating around a given centre,
    the body is fastened to the bottom of the water basin so as to be completely immersed in water, and
    the apparatus (1) is immersed totally under the water except for the means for transferring energy from the energy reserve (3) so that at least the body and the means for storing the kinetic energy of the body are immersed totally under the water.

2. An apparatus as defined in claim 1, characterised in that
the body (2) is plate-like and it is fastened at one side to a base (4) on the bottom (6) of the water basin
the body (2) has a weight less than the specific weight of water.

3. An apparatus as defined in claim 2, characterised in that the kinetic energy of the plate-like body is stored in a pressure tank (3; 31), which is located substantially under the water surface and contains a medium.

4. An apparatus as defined in claim 2, characterised in that the plate-like body (2) and the pressure tank (3; 31) are fastened to a base (4) located on the bottom (6) of the water basin.

5. An apparatus as defined in claim 2, characterised in that the apparatus (1) comprises
a first piping (33; 33a) for conducting a medium to the object of application,
a second piping (33; 33b) for transferring the medium into a pressure tank (3; 31).

6. An apparatus as defined in claim 2, characterized in that the kinetic energy of the plate-like body is stored in a pressure tank (3; 31), which is located substantially under the water surface and contains air.

7. An arrangement for utilising wave energy, in which a water mass (5) actuate a body (2) located at the bottom of a water basin, characterised in that
the body is immersed in water in its totality,
the body is attached at one side to the bottom (6) of the water basin, at intermediate water depth in the water basin, where the movement of each point of water mass (5) is substantially reciprocating around a given centre,
the body is used for recovery of the kinetic energy of the reciprocating movement of the water mass,
the kinetic energy of the body (2) is recovered into an energy reserve (3),
the energy is transferred from the energy reserve to the object of application.

8. An arrangement as defined in claim 1, characterised in that the body is fastened to the bottom of the water basin at a depth deeper than the wave breaking line, roughly in an area where the ratio of the wavelength L to the depth of the water basin H is in the range from 1/20 to 1/2.

9. An arrangement as defined in claim 1, characterised in that the reciprocating movement of the water mass (5) actuates a plate-like body (2), which is attached to the bottom of a water basin at one side, the kinetic energy of the plate-like body being recovered into an energy reserve located substantially under the water surface (5; 51).

10. An arrangement as defined in claim 7, characterised in that the reciprocating movement of the water mass (5) actuates a plate-like body (2), which is attached to the bottom of a water basin at one side, the kinetic energy of the plate-like body being recovered into an energy reserve located substantially under the water surface (5; 51), the energy reserve being a pressure tank (3; 31).

11. An arrangement for utilising wave energy, comprising:
an object of application;
an energy reserve (3); and
a body (2) actuated by a water mass (5),
the body (2) located near a bottom of a water basin,
the body totally immersed in water,
the body attached at one side to the bottom (6) of the water basin, at an intermediate water depth in the water basin, where the movement of each point of the water mass (5) is substantially reciprocating around a given center, wherein,
the body recovers kinetic energy of the reciprocating movement of the water mass,
the kinetic energy of the body (2) is recovered into the energy reserve (3), and
the energy recovered into the energy reserve is transferred from the energy reserve to the object of application.

12. The arrangement of claim 11, wherein, the body is fastened to the bottom of the water basin at a depth deeper than a wave breaking line, in an area where a ratio of a wavelength L to the depth of the water basin H is in the range from 1/20 to 1/2.

13. The arrangement of claim 11, wherein, the reciprocating movement of the water mass (5) actuates a plate-like body (2), which is attached to the bottom of a water basin at one side, the kinetic energy of the plate-line body being recovered into an energy reserve located substantially under the water surface (5; 51).

14. The arrangement of claim 13, wherein the energy reserve is a pressure tank.

* * * * *